(12) United States Patent
Daullary (10) Patent No.: US 9,430,955 B2
(45) Date of Patent: Aug. 30, 2016

(54) BREASTFEEDING TRAINING SYSTEM (71) Applicant: Cynthia Daullary, Toms River, NJ (US)

(72) Inventor: Cynthia Daullary, Toms River, NJ (US)

( * ) Notice: Subject to any disclaimer, the term of this patent is extended or adjusted under 35 U.S.C. 154(b) by 0 days.

(21) Appl. No.: 13/735,179

(22) Filed: Jan. 7, 2013

(65) Prior Publication Data
US 2013/0177888 A1 Jul. 11, 2013

Related U.S. Application Data (60) Provisional application No. 61/568,296, filed on Jan. 9, 2012.

(51) Int. Cl.
G09B 23/30 (2006.01)

(52) U.S. Cl.
CPC .................................... G09B 23/30 (2013.01)

(58) Field of Classification Search
CPC ... A41D 1/205; A61M 2205/56; A63H 3/00; A63H 3/003; A63H 3/02; A63H 3/46; A63H 3/48; A63H 33/26; G09B 23/30; G09B 23/32
USPC ........ 434/256, 267, 260, 393, 270; 446/304, 446/330, 369, 371, 395; 623/7
See application file for complete search history.

(56) References Cited

U.S. PATENT DOCUMENTS

| | | | |
|---|---|---|---|
| 3,562,925 A * | 2/1971 | Baermann et al. | 434/265 |
| 3,826,019 A * | 7/1974 | Knapp | G09B 23/281 434/273 |
| 4,033,071 A * | 7/1977 | Strongin et al. | 446/177 |
| 4,249,337 A | 2/1981 | Edson | |
| 4,575,351 A | 3/1986 | Gonzalez | |
| 4,772,262 A | 9/1988 | Grant, Jr. et al. | |
| 4,815,977 A * | 3/1989 | Peters | 434/267 |
| 6,517,513 B1 | 2/2003 | Covington | |
| 7,101,350 B2 | 9/2006 | Ytteborg | |
| 7,207,336 B1 | 4/2007 | Doiron | |
| D576,283 S | 9/2008 | Marshall et al. | |
| 2002/0063103 A1 | 5/2002 | Kiernan | |
| 2002/0139767 A1 | 10/2002 | Budd | |
| 2002/0193731 A1 | 12/2002 | Myers et al. | |
| 2003/0153869 A1* | 8/2003 | Ytteborg | 604/74 |
| 2005/0234370 A1 | 10/2005 | Beal et al. | |
| 2007/0210235 A1 | 9/2007 | Hood | |
| 2008/0077040 A1 | 3/2008 | Ales et al. | |
| 2008/0077042 A1 | 3/2008 | Feldkamp et al. | |

(Continued)

FOREIGN PATENT DOCUMENTS

CN 2413772 Y * 1/2001
CN 2762849 Y * 3/2006

(Continued)

OTHER PUBLICATIONS

"Bebé Glotón: The Breastfeeding Doll," http://www.drmomma.org/2009/07/bebe-gloton-breastfeeding-doll.html, 2009.*

(Continued)

Primary Examiner — Robert J Utama
Assistant Examiner — Jennifer L Korb
(74) Attorney, Agent, or Firm — Baldini Law, LLC; Jack B. Baldini, Esq.

(57) ABSTRACT

This invention relates generally to breastfeeding training and more specifically to devices comprised of a doll and chest piece used for breastfeeding training.

12 Claims, 7 Drawing Sheets (56) References Cited

U.S. PATENT DOCUMENTS

| | | | |
|---|---|---|---|
| 2008/0097169 A1 | 4/2008 | Long et al. | |
| 2008/0108882 A1 | 5/2008 | Garbin | |
| 2009/0233518 A1 | 9/2009 | Hui | |

FOREIGN PATENT DOCUMENTS

| | | | |
|---|---|---|---|
| CN | 100593429 C | * | 3/2010 |
| WO | WO2004026368 A2 | | 4/2004 |
| WO | WO2008034194 A2 | | 3/2008 |
| WO | WO2008034194 A9 | | 3/2008 |
| WO | WO2008026088 A1 | | 6/2008 |
| WO | WO2009093238 A1 | | 7/2009 |
| WO | WO2009134274 A1 | | 11/2009 |

OTHER PUBLICATIONS

"Parents' Fury as Breastfeeding Doll for Young Girls Goes on Sale," http://www.dailymail.co.uk/newslworldnewslarticle-1204486/Meet-Beb/index.html, 2009.*

"Inductive Proximity Sensors," https://web.archive.org/web/20070616121123/http://www.omega.com/pptst/E57_5mm8mm.html, Jun. 16, 2007.*

"Cloth Breast Model," Shop Anatomical, https://web.archive.org/web/20110123174053/http://www.shopanatomical.com/Cloth_Breast_Model_Beige_p/he-79811.htm, May 1, 2010.*

"Lactessa Breastfeeding Model," Shop Anatomical, https://web.archive.org/web/20110115030755/http://www.shopanatomical.com/Lactessa_Breastfeeding_Model_Beige_p/he-79800.htm May 1, 2010.*

"Female Education," Shop Anatomical, https://web.archive.org/web/20100501031116/http://www.shopanatomical.com/Female_Education_s/10743.htm, May 1, 2010.*

"Cloth Breast and Breastfeeding Puppet," Childbirth Graphics, https://www.youtube.com/watch?v=OijbqHQ9Elc, Aug. 6, 2010.*

"Breastfeeding Trainer Mother's Own Milk," Cascade, http://www.1cascade.com/p/53572/mothers-own-milkreg-breastfeeding-trainer, May 1, 2010.*

"Breastfeeding Hand Puppet," Shop Anatomical, https://web.archive.org/web/20110123175813/http://www.shopanatomical.com/Breastfeeding_Hand_Puppet_Beige_p/he-85008.htm May 1, 2010.*

"Hands-on approach during breastfeeding support in a neonatal intensive care unit: a qualitative study of Swedish mothers' experiences," Weimers et al., http://www.ncbi.nlm.nih.gov/pmc/articles/PMC1634844/pdf/1746-4358-1-20.pdf, International Breastfeeding Journal 2006, 1:20, Oct. 26, 2006.*

"Training of Trainers for Mother-to-Mother Support Groups, LINKAGES Project," https://web.archive.org/web/20040628112536/http://www.linkagesproject.org/media/publications/Training%20Modules/MTMSG. pdf, Jun. 28, 2004.*

"Training Guide for Health Workers Handouts," Core Group, http://web.archive.org/web/20110410201703/http://www.coregroup.org/storage/Nutrition/ENA/IIB._HW_Training_Handouts_complete.pdf Apr. 10, 2011.*

"Mimijumi Baby Bottle—Very Hungry—8 oz," http://www.amazon.com/Mimijumi-Baby-Bottle-Very-Hungry/dp/B00478UG46/ref=cm_cr_pr_product_top?&ie=UTF8, Feb. 4, 2011.*

"Latch On," Ameda, https://www.youtube.com/watch?v=ZIn0LTkejls, Dec. 9, 2007.*

"Breast Pump Reviews: Features Explained," Which Works for You, http://web.archive.org/web/20110411173034/http://www.which.co.uk/baby-and-child/nursery-and-feeding/reviews/breast-pumps/page/features-explained/, Apr. 11, 2011.*

"Nipples," Nuby Natural Touch, http://web.archive.org/web/20100128021041/http://www.nuby.com/en/natural-touch/nipples, Jan. 28, 2010.* http://www.dailymail.co.uk/news/worldnews/article-1204486/Meet-Beb/index.html, printed Nov. 11, 2009.

http://www.laerdal.com/doc/42020286/Newborn-Anne.html.

* cited by examiner

BREASTFEEDING TRAINING SYSTEM

This application claims priority to Provisional U.S. Patent Application Ser. No. 61/568,296, filed Jan. 9, 2012.

FIELD OF THE INVENTION

This invention relates generally to breastfeeding training and more specifically to devices comprised of a doll and chest piece used for breastfeeding training.

BACKGROUND

Breast milk has numerous nutritional advantages as it contains the proper balance of amino acids, sugars and fats for the human baby, as well as vitamins, enzymes, and minerals that are best suited for the baby's intestinal tract and aid in digestion. Breast-fed babies have reduced risk of infection as the breast milk contains infection-fighting antibodies. Furthermore, the high cholesterol content in breast milk promotes brain growth in the baby. In addition to these health benefits, breast-feeding is the least expensive way of feeding the baby.

Despite the various advantages of breastfeeding, new mothers may still be unsure whether or not to breastfeed their baby. Issues such as discomfort, damage to the nipple, insufficient milk supplied to the baby and mastitis concern many new mothers when considering whether to breastfeed. Many of these issues can be remedied by proper placement of the baby relative to the mother's nipple. This proper positioning is referred to as "latch-on." In general, proper latch-on is achieved when the mother's nipple is elongated and deep enough in the baby's mouth to reach the baby's soft palate. The soft palate is located behind the hard palate, which in turn is located behind the gums. Since the location of soft palate is quite deep in the baby's mouth, it is difficult for some mothers to position the baby to achieve proper latch-on. However, proper latch-on is necessary to optimize the breast milk drawn by the baby and to avoid undue pain, discomfort and injury to the mother.

Accordingly, to address expectant mothers' myriad concerns and to teach proper latch-on, lactation consultants assist mothers by preparing them for breastfeeding and providing counsel on medical issues and other concerns that can arise in the course of breastfeeding a baby.

Methods exist that assess the quality of breast-feeding. For example, U.S. Patent Application US20080108882A1 discloses methods of assessing the health of a breastfeeding relationship that include clinical assessment. In another example, U.S. Patent Application US20080077042A1 discloses a method for quantifying breastfeeding between a mother and a baby. In another example, U.S. Patent Application US20080077040A1 discloses another method for quantifying breastfeeding between a mother and a baby. In another example, U.S. Patent Application US20080097169A1 discloses another method for quantifying breastfeeding between a mother and a baby. In another example, WO2008034194A9 discloses a method of assessing breastfeeding. In another example, WO2009093238A1 discloses a method of monitoring amount of milk consumed by an infant being breastfed by a breast, comprising determining variations in electric capacitance of the breast during breastfeeding, and correlating said electric capacitance variations to an amount of milk consumed by the infant. In another example, WO2008026088A1 discloses another method for quantifying breastfeeding between a mother and a baby.

Similarly, devices exist that provide assistance during breastfeeding. For example, U.S. Pat. No. 7,207,336 B1 discloses a compression device for use in helping a woman breastfeed an infant.

While these may be important in ascertaining the overall health of an infant, the impact of breastfeeding on an infant's health, or assisting the mother while breastfeeding, these references do not provide a means to teach the proper breast-feeding technique.

The use of dolls in the shape of patients is well known in the field of medical education and training. For example, dolls have long been used in cardiopulmonary resuscitation (CPR) training to assist trainees in learning the proper techniques in administering CPR. CPR trainees can press on the doll's chest and blow air into the doll's mouth to fill the doll's artificial lungs with air, and the dolls provide life-like responses to the trainee's actions.

A breastfeeding training doll can provide an effective means for lactation consultants to demonstrate proper latch-on positioning of the baby to expectant mothers. However, while the use of dolls in the shape of patients is well known in the field of medical education and training and devices that are capable of simulating biological functions, including the separate biological functions that may be associated with breastfeeding, such as suckling, for example, a device combining all the biological functions associated with breastfeeding does not currently exist.

Devices that are capable of expressing fluids, such as, for example, breast milk, from breasts are known. For example, U.S. Pat. No. 7,101,350 B2 discloses a breast cup for placing around a nipple and an areola area on a woman's breast, said breast cup being in the form of a truncated cone with a conical part and an approximately cylindrical part by the conical part of the cone, said cylindrical part of the breast cup forming first and second stimulating means that simulate the sucking and palate/tongue, respectively, of a breastfeeding child, and said conical part of the breast cup forming a third stimulating means that simulates the lips/jaws of a breastfeeding child.

In another example, U.S. Pat. No. 6,517,513 B1 discloses a pump having compression, suction, and heat adapted to optimize noninvasive extraction of intraductal breast fluid.

In another example, U.S. Pat. No. 4,772,262 A discloses a breast pump including a vacuum pump, vacuum hose, collection container, and a milk pumping flange for application to a woman's breast for removing milk from the breast.

In another example, U.S. Patent Application US20070210235A1 discloses a suction-based holder, comprising: a suction portion having a housing and a suction interface, the suction interface having an inner face and an outer face, wherein portions of the inner face of the suction interface are associated with the housing; a receptacle portion having a receiving channel defined therein; and a connector portion connecting the suction portion and the receptacle portion.

In another example, U.S. Patent Application US20050234370A1 discloses a system for expressing milk from a human breast, comprising: a control system adapted to be worn by a user; a massaging means adapted to be located posterior to the areola; an expression means adapted to be located in the vicinity of the areola; and containment means adapted to contain the expressed milk.

In another example, U.S. Patent Application US20030153869A1 discloses a breast cup for placing around a nipple and an areola area on a woman's breast, which breast cup is in form of a truncated cone with an approximately cylindrical portion by the truncated part of the cone, which cylindrical part of the breast cup forms first and second stimulating means that simulate the sucking and palate/tongue, respectively, of a breastfeeding child, and the conical part of the breast cup forms a third stimulating means that simulates the lips/jaws of a breastfeeding child.

In another example, U.S. Patent Application US20020193731A1 discloses a portable, hands-free and visually friendly breast pump for facilitating breast-pumping.

In another example, WO2009134274A1 discloses compact and hands-free human breast milk collection device that fits into a mother's existing nursing or standard brassiere.

In another example, WO2004026368A2 discloses a system for expressing milk from a human breast, comprising: a control system adapted to be worn by a user; a massaging means adapted to be located posterior to the areola; an expression means adapted to be located in the vicinity of the areola; and containment means adapted to contain the expressed milk.

Devices that simulate nipples are known. For example, U.S. Patent Application US20020139767A1 discloses a sipping lid for baby bottles.

In another example, U.S. Patent Application US20020063103A1 discloses a nursing bottle nipple for insertion past the lips of an infant and into the infant's mouth.

Anatomical training dolls are known. For example, the manikin disclosed in the publication located at http://www-.laerdal.com/doc/42020286/Newborn-Anne.html discloses a manikin designed for skills training in neonatal resuscitation.

However, relatively few such training dolls have been developed to assist lactation consultants in their work. Artificial babies, such as the Lactessa™ doll are available to demonstrate the proper position for holding a baby. The Lactessa™ doll also allows a user to feel in the doll's mouth with her finger to determine the location of the hard and soft palate in the doll's mouth.

Also available is the device disclosed in U.S. Pat. No. 4,815,977. This reference discloses a breast-feeding trainer . . . to be worn over clothing in the teaching of nursing techniques. The patent claims "a breast-feeding trainer comprising a lightweight simulated human female breast having a simulated human nipple, and support means for positioning the simulated breast on the chest of a human wearer, said nipple being oriented for access thereto during breast-feeding training without removal of said support means by the human wearer."

Also available is the device disclosed in U.S. Pat. No. 4,575,351 A. This reference discloses a training doll for prospective mothers, sisters, child attendants and the like is provided which includes a life-like torso having the approximate weight, size and appearance of a baby, preferably a newborn infant.

Also available is the device disclosed in U.S. Pat. No. 4,249,337 A. This reference discloses a breast feeding doll set comprising a mother doll having simulated breasts, first fastening means secured to the tip of each breast, a baby doll having a head and second fastening means secured to the head at the location of the mouth, said first and second fastening means being complimentary to each other for securing the baby doll to the mother doll in a simulated breast feeding operation and means for maintaining the arms of the mother doll in holding relation with respect to the baby doll.

Also available are toy doll sets such as the Bebe Gloton/ THE BREAST MILK BABY®, a toy simulated breast milk feeding baby that does not require actual suction or latch-on but merely proximity to a pre-defined sensor in order to signify breast feeding, disclosed in the website located at http://www.dailymail.co.uk/news/worldnews/article-1204486/Meet-Beb/index.html, that are intended for children, consisting of a doll and chest piece. The Bebe Gloton/ THE BREAST MILK BABY® system provides a doll that reacts by producing mouth sucking motions and sounds when the mouth of the doll is in proximity to the chest piece.

Also available is the doll disclosed in U.S. Patent Application US20090233518A1. This reference discloses an interactive toy doll where the doll interacts with the user by reacting to its own orientation and to pressure applied to its body or mouth . . . . The doll can be fed by placing a toy bottle in the doll's mouth. The doll will then react by making sounds of a baby sucking on a bottle. After a set period of time in which the doll has not been fed, the doll will emit crying sounds, as if the doll is hungry.

Also available is the device disclosed in U.S. Design Patent D576283S1.

However, these references do not provide feedback on whether the user is correctly positioning the doll for latch-on, nor do they interact directly with the user's own breast, nor do they provide an effective means to teach proper breast-feeding techniques.

Thus, the need exists for a breastfeeding training doll that will allow expectant mothers to practice breastfeeding and provides feedback to indicate when the baby achieves a successful latch onto the breast.

SUMMARY

The present invention provides and enables the following features, benefits and advantages, among others. In one aspect, the invention comprises a doll and a chest piece system allowing a user to simulate breastfeeding, where the doll provides feedback to the user on correct positioning of the doll relative to the chest piece and effective latch-on of the doll's mouth to the chest piece's simulated breast and nipple.

In an alternate aspect, the invention comprises a doll, where the doll provides feedback to the user on correct positioning of the doll relative to the user's breast and effective latch-on of the doll's mouth to the user's breast and nipple.

The Doll: One aspect of the invention provides a doll comprising a humanoid figure shape defining a head, neck and body, a power source, a mouth mechanism, a trigger located in the mouth mechanism which defines a mouth cavity, and a feedback system. The power source is connected to the trigger and feedback system. The feedback system receives and processes signals provided by the trigger, and depending on the trigger signal, outputs an alert to the user that indicates the doll is properly positioned for latch-on. The feedback system will be configured for certain trigger signals that indicate the correct latch-on position. When the feedback system receives such correct latch-on signal, the feedback system will output the alert. In an embodiment of the invention, the trigger further comprises a sensor.

In one aspect of the invention, the feedback system includes a suction mechanism located within the doll. In one embodiment, the suction mechanism includes a pump comprising a motor connected to a tube disposed through the neck of the doll, with one end of the tube connected to a suction ingress disposed in the mouth mechanism. In one embodiment, the suction mechanism operates similarly to electronic breast pumps and imitates the natural sucking rhythms of a baby.

In another aspect of the invention, the mouth mechanism is connected to the feedback system. In concert with the suction mechanism, the mouth mechanism will simulate mouth suction movements of a baby.

In another aspect of the invention, the mouth mechanism further defines a soft palate, hard palate, gums and a movable mouth. Each section of the mouth mechanism may be color coded for easy identification. In one embodiment, the mouth mechanism will simulate the movement of a baby's tongue against the baby's palate.

In another aspect of the invention, the head of the doll further comprises a transparent cheek area. The transparent cheek area allows a user to view the internal geometry of the mouth mechanism and the positioning of the simulated breast and nipple within the mouth.

In another aspect of the invention, the feedback system includes a light emitting diode (LED) disposed on the surface of the doll. Preferably, the LED is positioned on an area easily visible to the user when using the doll for breast feeding training, such as on the forehead of the doll. When the feedback system receives a sensor signal indicating proper latch-on position, the feedback system will trigger the LED to an "on" state.

The Chest Piece: One aspect of the invention provides a chest piece comprising at least one simulated breast having a simulated nipple, and a support means for the user to wear the chest piece over her chest and clothes. The at least one simulated breast and simulated nipple are shaped to resemble a lactating human breast. The at least one simulated breast and simulated nipple are malleable to the extent allowing for elongation during suction action by the doll, but of sufficient strength and resiliency to return to a relaxed state without significant damage to the chest piece.

In one aspect of the invention, the chest piece comprises a single simulated breast with a simulated nipple, adapted to be positioned over the chest of the user so as to simulate a natural human breast. In an alternate aspect of the invention, the chest piece comprises two simulated breasts with simulated nipples, adapted to be positioned over the chest of the user so as to simulate a pair of natural human breasts.

In one aspect of the invention, the at least one simulated breast and simulated nipple is composed of a synthetic human tissue analog. In one embodiment, the at least one simulated breast and simulated nipple is composed of a resilient material selected from the group consisting of rubber, silicone, plastic and combinations thereof.

In one aspect of the invention, the chest piece is attached to a brassier-type garment, adapted to be worn over the user's clothes.

In one aspect of the invention, the chest piece fits over the mother's actual breast in a manner that exposes and positions the mother's actual breast and nipple for practice utilizing the doll of the present invention.

The Doll-Chest Piece System: In one embodiment, the trigger in the doll's mouth mechanism is reactive to the simulated nipple on the at least one simulated breast in the chest piece. In an embodiment where the trigger comprises a sensor, the sensor has a sensing field in communication with the simulated nipple.

In one embodiment, when the simulated nipple is within a specified or pre-set distance relative to the sensor, the sensor sends a signal to the feedback sensor. The specified or pre-set distance of the simulated nipple relative to the sensor could be, for example, the distance corresponding to the touching of the simulated nipple to the doll's mouth mechanism. Alternatively, the specified or pre-set distance of the simulated nipple relative to the sensor could be the distance corresponding to the elongation of the simulated nipple that is the result of the correct positioning of the doll's mouth mechanism on the at least one simulated breast. One of ordinary skill in the art can readily determine the types and parameters for one, or more than one specified or pre-set distance, and can program the system of the present invention to respond differently according to the what specified or pre-set distance of the simulated nipple relative to the sensor is being sensed at any given time. For example, in one embodiment, when the simulated nipple is within a specified or pre-set distance relative to the sensor that corresponds to the elongation of the nipple that is the result of the correct positioning of the doll's mouth mechanism on the at least one simulated breast, the sensor sends a signal to the feedback system, which then outputs an alert to the user to indicate proper latch on. In one aspect of the invention, the feedback system will activate the LED disposed on the doll body upon receiving the proper latch-on signal from the sensor.

In another aspect of the invention, the suction mechanism in the doll will work upon the simulated nipple, causing the simulated nipple and simulated breast to elongate into the mouth cavity. When the simulated nipple is elongated into the doll's mouth cavity within a specified distance relative to the sensor, the sensor will send a proper latch-on signal to the feedback system and the feedback system will activate an alert to the user. In yet another aspect of the invention, in concert with the suction mechanism, the doll's mouth mechanism will also simulate sucking motions upon the simulated nipple on the at least one simulated breast.

In another aspect of the invention, the head of the doll further comprises a transparent cheek area allowing a user to view the internal geometry of the mouth mechanism. The transparent cheek area provides a view to observe the elongation of the simulated nipple as it is sucked into the internal mouth cavity of the mouth mechanism.

This summary is an overview of some of the teachings of the present application and not intended to be an exclusive or exhaustive treatment of the present subject matter. Further details about the present subject matter are found in the detailed description and appended claims. Other aspects of the invention will be apparent to persons skilled in the art upon reading and understanding the following detailed description and viewing the drawings that form a part thereof. The scope of the present invention is defined by the appended claims and their legal equivalents.

BRIEF DESCRIPTION OF THE DRAWINGS

The invention, as well as features and advantages thereof, will be more readily understood from the following detailed description corresponding to the following drawings.

DETAILED DESCRIPTION

In the following detailed description, reference is made to the accompanying drawings, which form a part hereof, and in which is shown by way of illustration, specific embodiments in which the invention may be practiced. These embodiments are described in sufficient detail to enable those skilled in the art to practice the invention, and it is to be understood that the embodiments may be combined, or that other embodiments may be utilized and that structural, logical and electrical changes may be made without departing from the spirit and scope of the present invention. References to "an", "one", or "various" embodiments in this disclosure are not necessarily to the same embodiment, and such references contemplate more than one embodiment. The following detailed description provides examples, and the scope of the present invention is defined by the appended claims and their legal equivalents.

Figure 1:
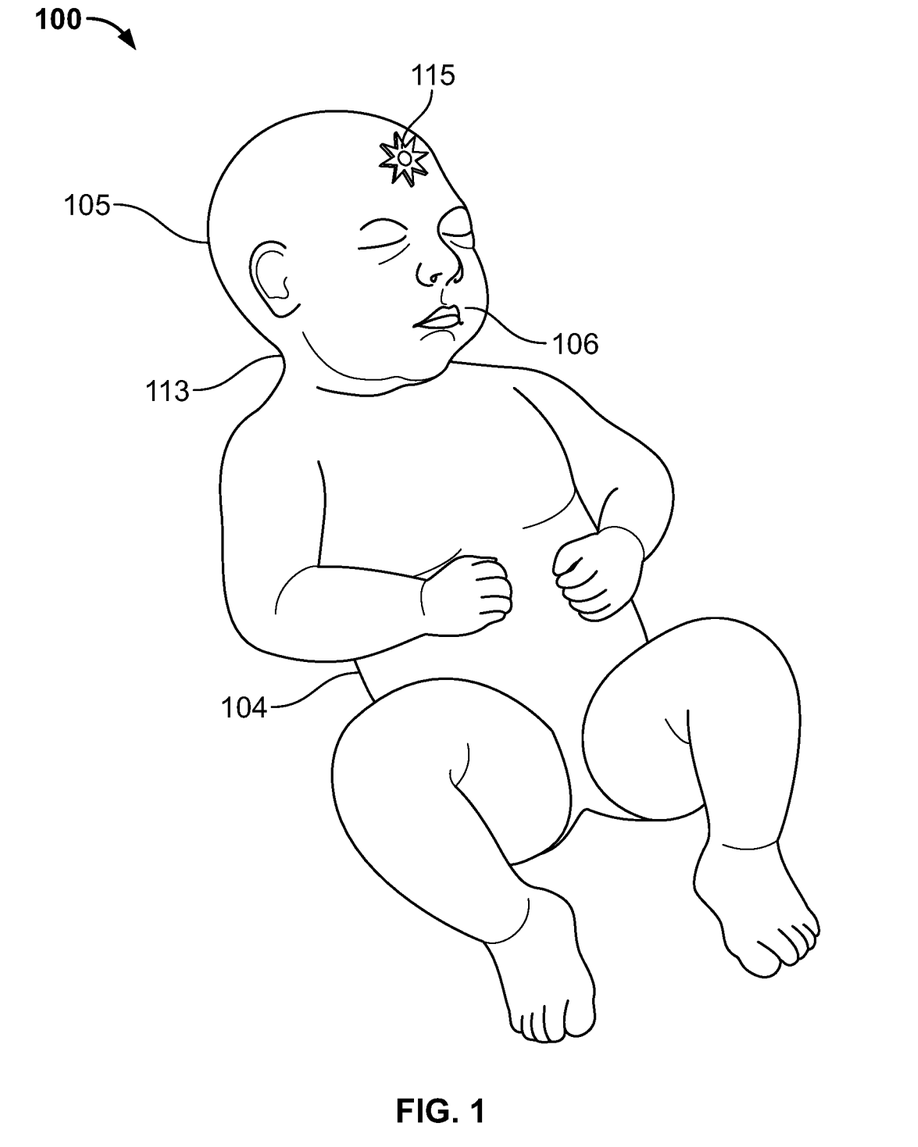
FIG. 1 depicts a front view of one embodiment of the doll.

FIG. 1 depicts a general front view of one embodiment of the doll 100 of the present invention having a humanoid figure shape. Doll 100 comprises a head 105, and a body 104. A neck 113 secures the head 105 to the body 104. Head 105 further defines a mouth mechanism 106. At least one light emitting diode (LED) 115 is disposed on an area of the head easily viewable to a user, such as the forehead or temple region.

The head 105, the body 104, and the neck 113 may be hollow, either in their entirety, or in specific areas that allow the location of various components that enable the doll 100 to function according to the present invention.

Doll 100 is preferably similar to the size, shape, weight and feel of a newborn human infant. Head 105 and body 104 are preferably formed of flexible or semi-flexible material or materials, such as, for example, a synthetic human tissue analog, and are weighted to simulate the weight of a human infant.

In one embodiment, head 105 is movably attached to neck 113 to simulate the natural movement of a human infant's head.

Figure 2:
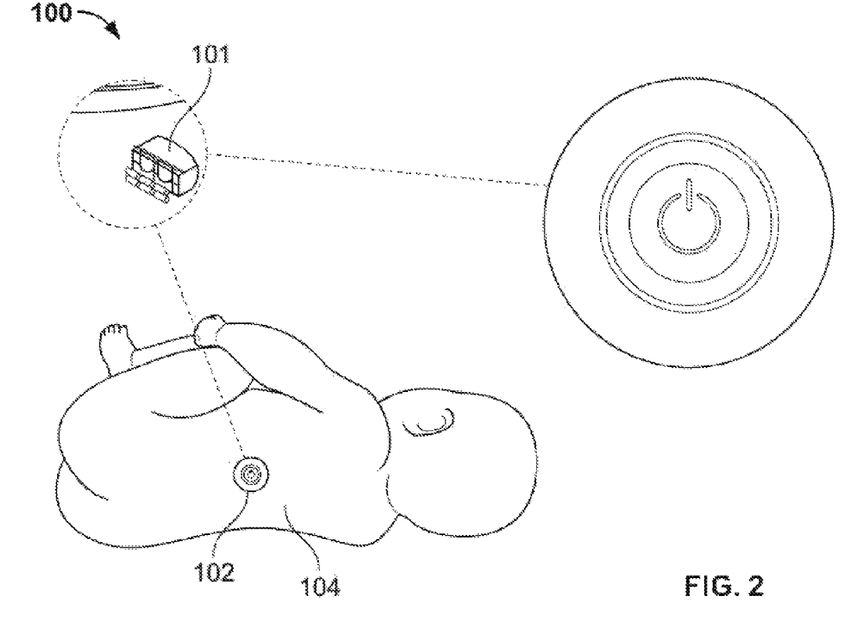
FIG. 2 depicts a rear view of one embodiment of the doll with reference to the power source and placement of power button.

FIG. 2 depicts a rear view of one embodiment of the doll 100 of the present invention, showing a preferred embodiment where a power button 102 is positioned on the back of the body 104 and electrically connected to a power source 101 disposed within the body 104.

Figure 3:
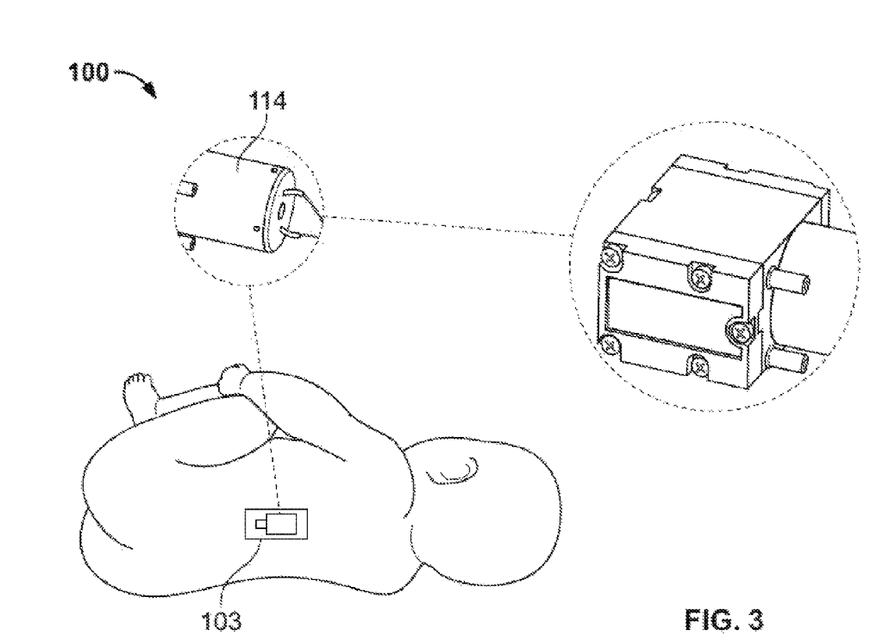
FIG. 3 depicts the general placement of the feedback system and suction device within one embodiment of the doll.

FIG. 3 depicts a rear view of one embodiment of the doll 100 of the present invention, showing a preferred embodiment where a feedback system 103 is disposed in the interior of the body 104 and electrically connected to the power source 101 shown in FIG. 2. In one embodiment of the invention, the feedback system 103 includes a suction device 114. The feedback system is also operatively connected to a sensor device 111 (shown in FIG. 7) and the LED 115 (shown in FIG. 1).

In one embodiment, the feedback system 103 receives and processes signals provided by the elements it is operatively connected to, and is capable of processing those signals and triggering the appropriate response in the system of the present invention. Such responses may include, for example, an alert indicating that the doll is properly positioned for latch-on, the activation of the doll mouth mechanism, opening the mouth, or the activation of the doll mouth mechanism to simulate sucking, and the like.

The choice of feedback system can be readily determined by one of ordinary skill in the art. Feedback systems that may be utilized or modified for use in the system of the present invention may be found for example, in the website located at http://www.dailymail.co.uk/news/worldnews/article-1204486/Meet-Beb/index.html, or in U.S. Patent Application US20090233518A1.

Figure 4:
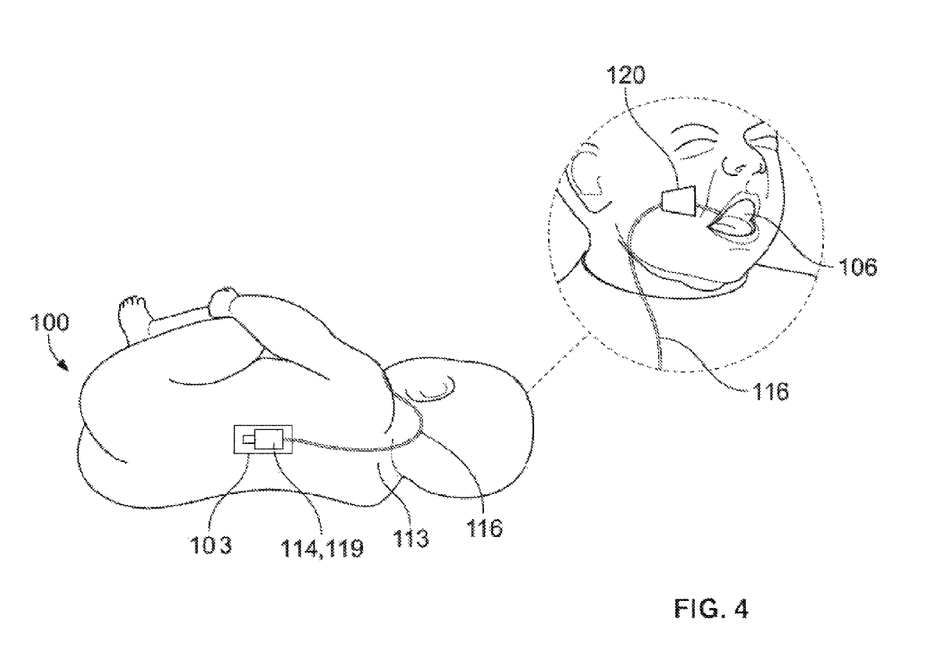
FIG. 4 depicts the connection between the mouth mechanism and the feedback system and suction device within one embodiment of the doll.

FIG. 4 depicts a perspective interior view of one embodiment of the doll 100 of the present invention, showing a connection between the feedback system 103 and mouth mechanism 106. Suction device 114 comprises a motor 119 connected to a tube 116 disposed through neck 113 and the other end of tube 116 connected to a suction ingress 120 disposed in mouth mechanism 106. When an object is placed in the mouth mechanism 106, the suction device 114 acts on the object through tube 116 connected to the suction ingress 120 disposed in mouth mechanism 106.

Existing components may be utilized or modified in order to be employed as the suction mechanism of the present invention. The choice of component can be readily determined by one of ordinary skill in the art. Components that may be utilized or modified for use in the system of the present invention may be found for example, in U.S. Pat. Nos. 7,101,350 B2; 6,517,513 B1; 4,772,262 A, U.S. Patent Application US20050234370A1, U.S. Patent Application US20020193731A1, WO2009134274A1, WO2004026368A2, or in U.S. Patent Application US20020139767A1.

Existing components may be utilized or modified in order to be employed as the suction ingress of the present invention. The choice of component can be readily determined by one of ordinary skill in the art. Components that may be utilized or modified for use in the system of the present invention may be found for example, in U.S. Patent Application US20030153869A1, or in WO2009134274A1.

Figure 5:
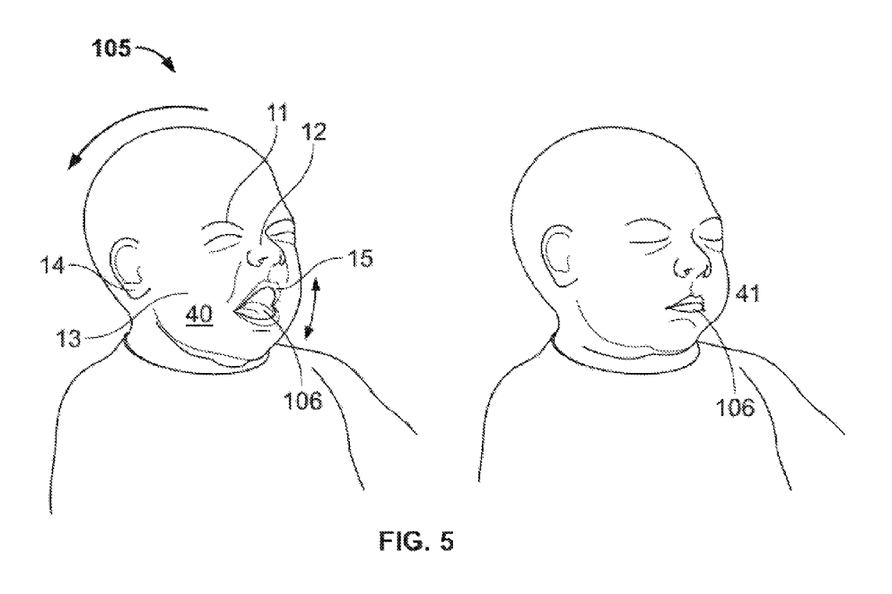
FIG. 5 depicts open and closed positions of one embodiment of the mouth mechanism.

FIG. 5 depicts the front of the head 105 in detail, showing one embodiment of the mouth mechanism 106 in an open mouth position 40, and a closed mouth position 41. In a preferred embodiment of the invention, the head 105 includes eyes 11, nose 12, cheeks 13, and ears 14, and mouth mechanism 106 will further comprise lips 15 to simulate the facial appearance of a human infant.

In one embodiment of the invention, mouth mechanism 106 is adapted to assume the open mouth position 40 when doll 100 is positioned within a range of reclining positions, and the mouth mechanism 106 assumes the closed mouth position 41 when doll 100 is positioned within a range of upright positions.

Existing components may be utilized or modified in order to be employed as the mouth mechanism of the present invention. The choice of component can be readily determined by one of ordinary skill in the art. Components that may be utilized or modified for use in the system of the present invention may be found for example, in Spanish Patent 2123408, or in Spanish Patent 1020080.

Figure 6A:
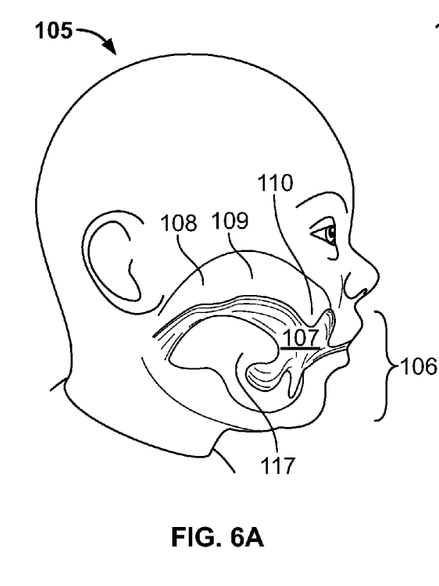
FIG. 6A depicts a cross-section of one embodiment of the doll head with detail of the mouth mechanism.

FIG. 6A depicts a cross-section view of head 105 with detail of mouth mechanism 106. The mouth mechanism 106 includes a mouth cavity 107 defined by a soft palate 108, a hard palate 109, gums 110, and a tongue 117 to simulate the natural mouth anatomy of a human infant. In an embodiment of the invention, the mouth mechanism 106 acts in conjunction with suction device 114 to create a suction effect on objects placed within the mouth cavity 107. In one embodiment, the mouth cavity 107 defined by a soft palate 108, a hard palate 109, gums 110, and a tongue 117 to simulate the natural mouth anatomy of a human infant forms the suction ingress 120.

Figure 6B:
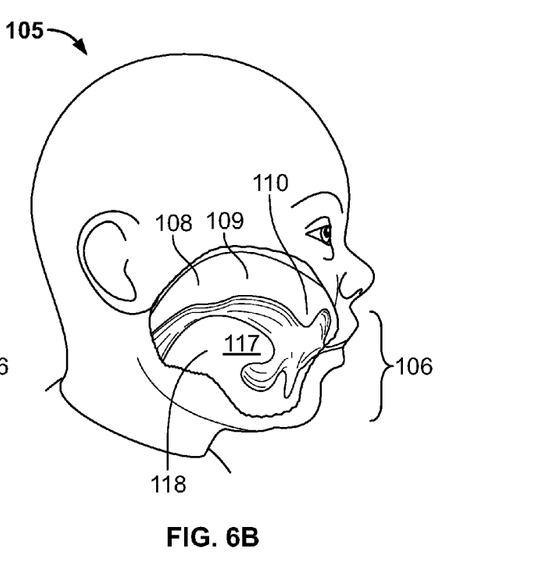
FIG. 6B depicts a detailed side view of one embodiment of the doll head including a transparent cheek.

FIG. 6B depicts a detailed side view of the doll head including a transparent cheek 118. The transparent cheek 118 allows a user to view the interior of the mouth mechanism 106. In an embodiment of the invention, the soft palate 108, the hard palate 109, gums 110, and tongue 117 are color-coded for easy identification.

Figure 7:
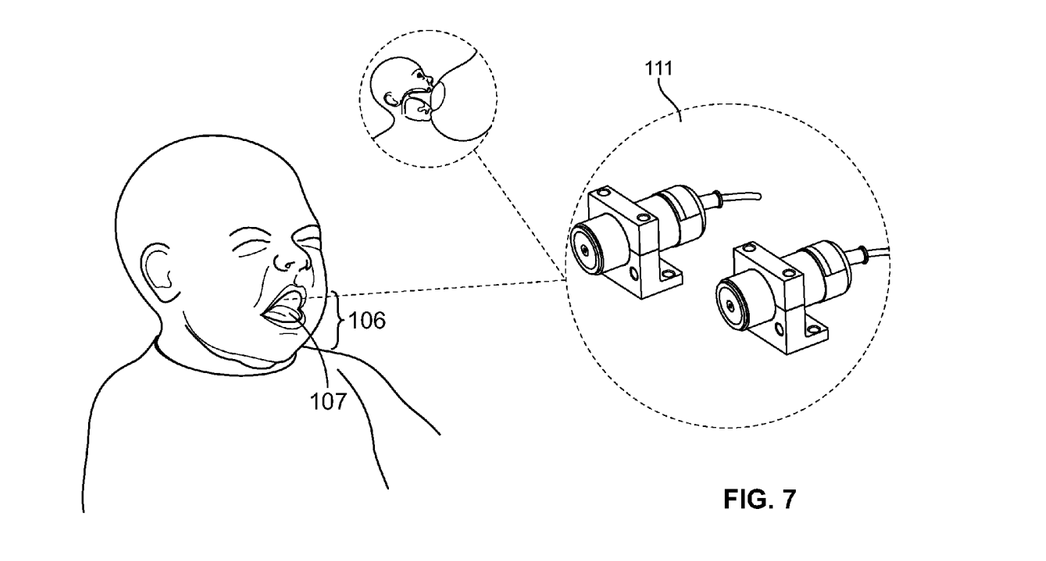
FIG. 7 depicts placement of the sensor within one embodiment of the mouth mechanism.

FIG. 7 depicts a sensor 111 disposed in the mouth cavity 107 of the mouth mechanism 106. One, or more than one sensor may be disposed in the mouth cavity 107. In one embodiment, sensor 111 is configured to detect objects displaced relative to sensor 111 within a preset range and delivers a signal to feedback system 103 when such objects are detected in such preset range. In one embodiment of the invention, the sensor 111 may comprise a capacitive proximity sensor such as the Omron E3K-C Adjustable Capacitive Proximity Sensor.

Figure 8:
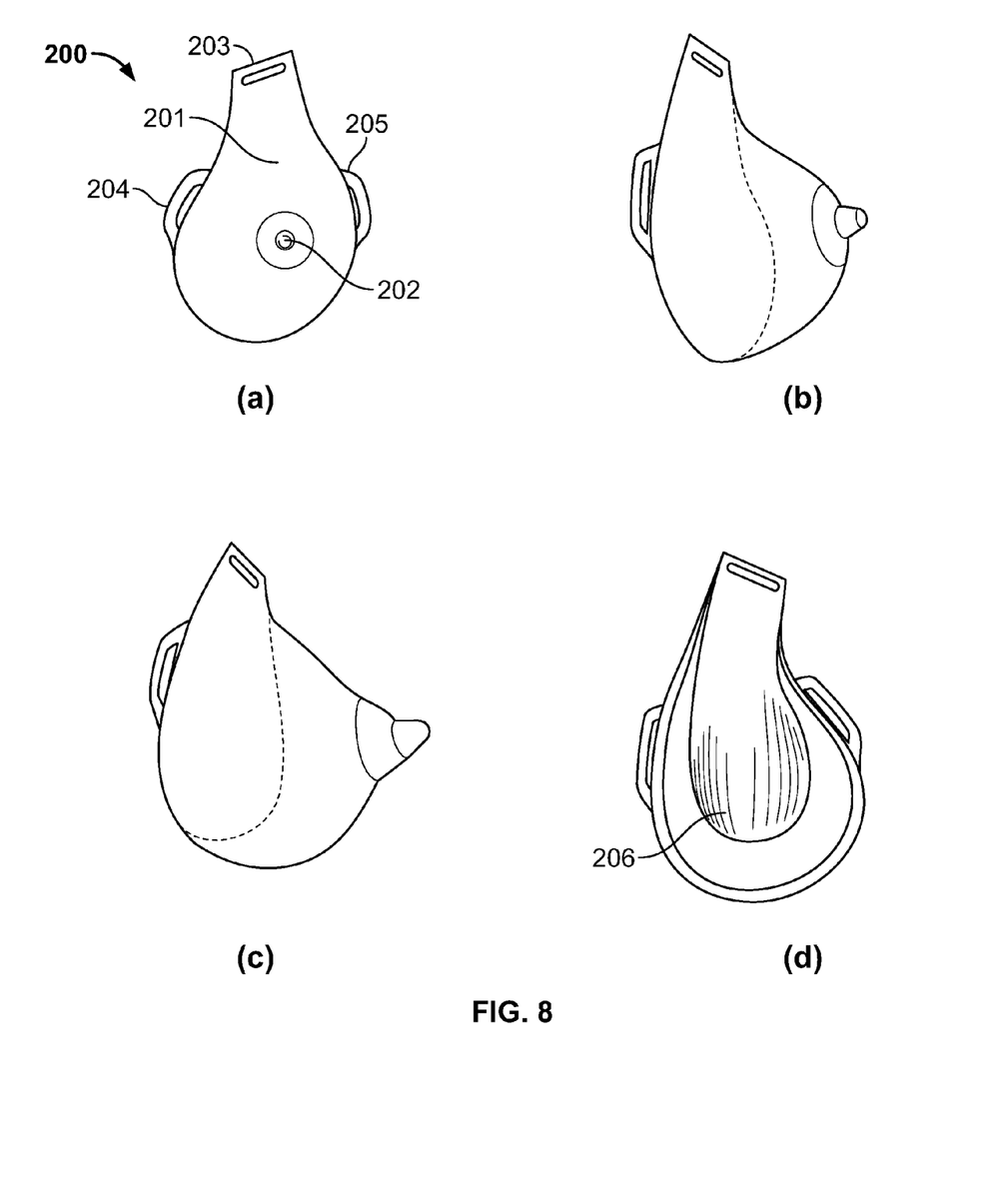
FIG. 8 depicts several views of one embodiment of the chest piece with one simulated breast.

FIG. 8 depicts front (a), side relaxed (b), side elongated (c), and rear (d) views of chest piece 200 comprising a single simulated breast 201 and simulated nipple 202 positioned on the simulated breast 201 to resemble a human breast during lactation. This embodiment shows a support means comprising a top slit 203, inner slit 204 and outer slit 205 adapted to receive straps to allow a user to position the chest piece 200 over her natural breast and over her clothes. Although not shown in this figure, chest piece 200 may also be attached to a brassier or brassier-like garment to allow the user to easily wear the chest piece 200. FIG. 8b shows in detail the rear of simulated breast 201, which defines breast cavity 206, and is contoured to accommodate the natural breast shape of the wearer.

Figure 9:
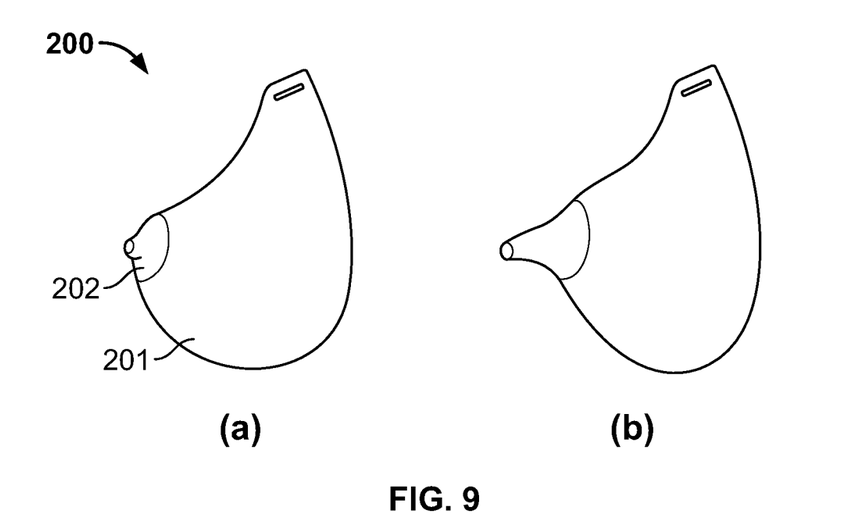
FIG. 9 depicts one embodiment of the simulated breast and simulated nipple in relaxed and elongated positions.

FIG. 9 depicts in detail side views of chest piece 200 with the simulated breast 201 and simulated nipple 202 in relaxed (a) and elongated (b) positions.

Figure 10:
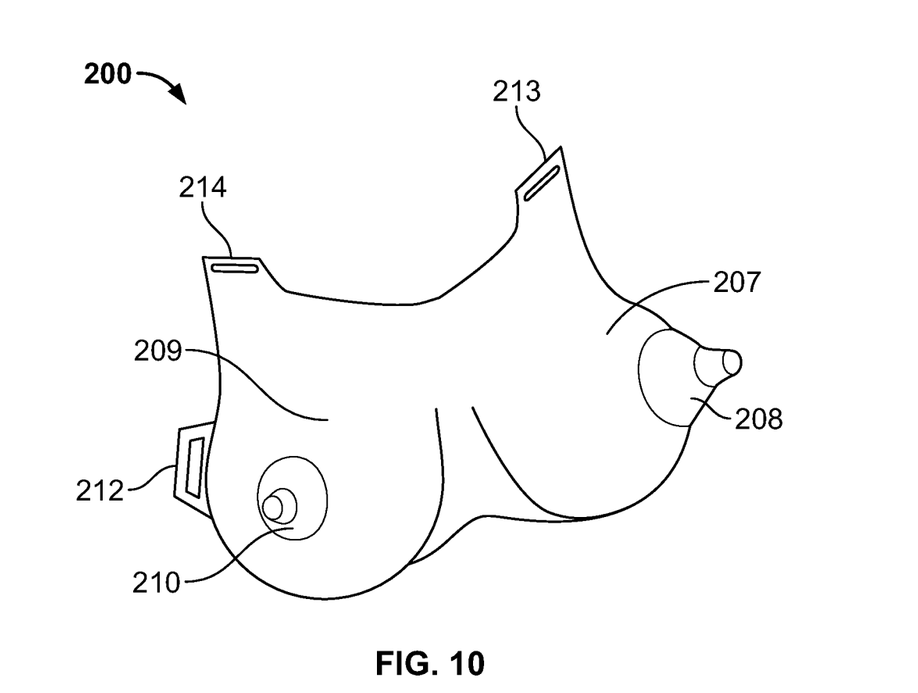
FIG. 10 depicts an embodiment of the chest piece with left and right simulated breasts and nipples.

FIG. 10 depicts another embodiment of chest piece 200 comprising a left simulated breast 207, a left simulated nipple 208 positioned on the left simulated breast 207, a right simulated breast 209 and right simulated nipple 210 positioned on the right simulated breast 209. In this embodiment the chest piece 200 resembles a pair of human breasts during lactation. This embodiment shows a support means comprising a left side slit 211 (not shown), right side slit 212, left top slit 213, and right top slit 214, adapted to receive straps to allow a user to position the chest piece 200 over her natural breasts and over her clothes. Although not shown in this figure, chest piece 200 may also be attached to a brassier or brassier-like garment to allow the user to easily wear the chest piece 200. Although not shown in FIG. 10, the left simulated breast 207 and right simulated breast 209 each define a breast cavity similar to the breast cavity 206 shown in FIG. 8d.

Existing components may be utilized or modified in order to be employed as the breast or nipple components of the present invention. The choice of component can be readily determined by one of ordinary skill in the art. Components that may be utilized or modified for use in the system of the present invention may be found for example, in U.S. Pat. No. 4,815,977, or in U.S. Pat. No. 4,249,337 A.

Figure 11:
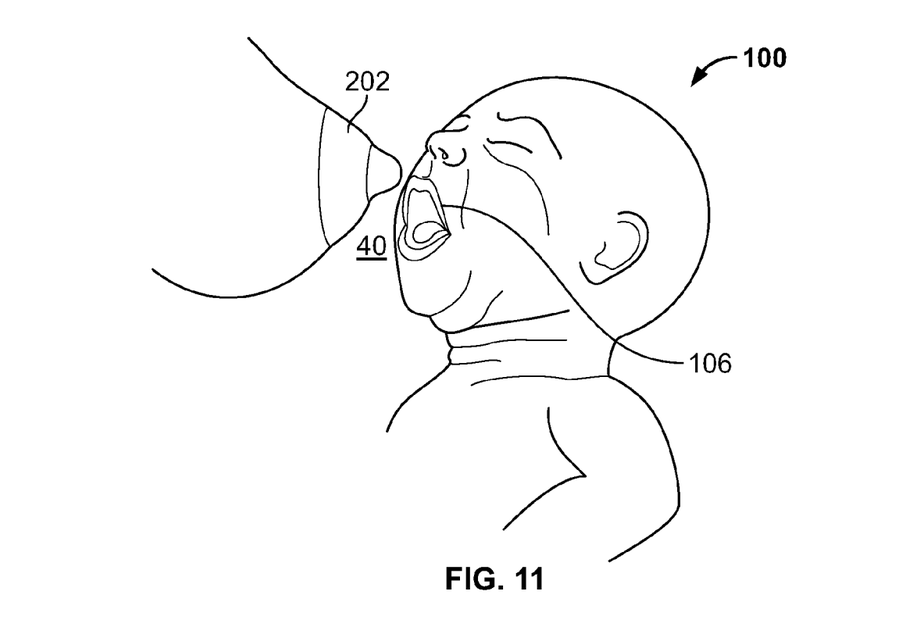
FIG. 11 depicts a perspective view of one embodiment of the doll relative to the chest piece in use.

FIG. 11 depicts one embodiment of the doll 100 with mouth mechanism 106 in open mouth position 40, adapted to receive the simulated nipple 202 or alternatively, a mother's actual nipple.

Figure 12:
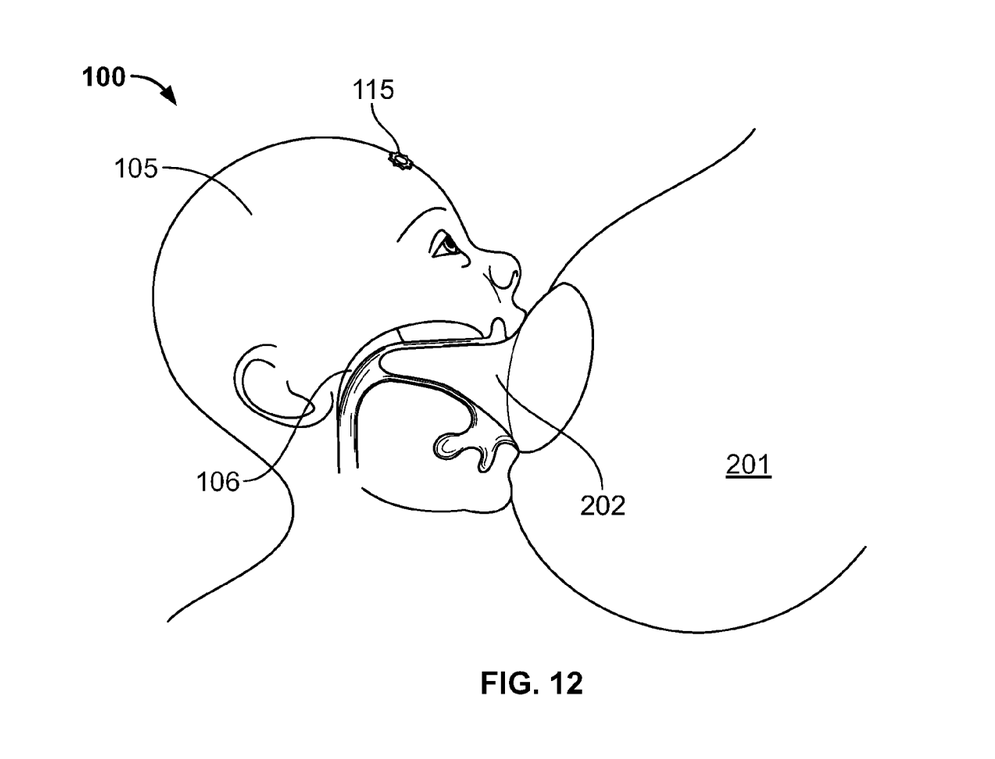
FIG. 12 depicts a cross-section of one embodiment of the mouth mechanism acting upon the simulated breast and simulated nipple. Alternatively, the simulated breast and nipple could be replaced with the mother's own breast and nipple.

FIG. 12 depicts a cross-section of the mouth mechanism 106 receiving and acting upon the simulated nipple 202 and simulated breast 201. When doll 100 is within range of a reclining position, the mouth mechanism 106 assumes open mouth position 40 as shown in FIG. 5(a), and the simulated nipple 202 is introduced into the mouth mechanism 106, then suction device 114 (not shown in this figure) acts upon simulated nipple 202 through mouth mechanism 106. The simulated nipple 202, or alternatively, a mother's actual nipple, elongates under the sucking action and when the simulated nipple 202 (or actual nipple) is elongated to the extent it is in proper range of sensor 111 (not shown in this figure), the sensor 111 sends a signal to the feedback system 103, and the feedback system 103 then outputs an alert to the user indicating proper latch-on position. In a preferred embodiment, the alert comprises the powering on of LED 115 disposed on head 105.

Publications cited throughout this document are hereby incorporated by reference in their entirety. Although the various aspects of the invention have been illustrated above by reference to examples and preferred embodiments, it will be appreciated that the scope of the invention is defined not by the foregoing description but by the following claims properly construed under principles of patent law.

What is claimed is:

1. A breastfeeding training system comprising:
   a. a chest piece comprising a wearable support means for removably positioning the chest piece on the chest of a user and at least one simulated human breast having a simulated nipple that elongates with the application of suction;
   b. a doll comprising a humanoid figure shape comprising a head and a body, a power source disposed within the body, a mouth mechanism disposed in the head, the mouth mechanism comprising a mouth cavity simulating a natural mouth anatomy of a human infant comprising simulated gums, hard palate, soft palate, tongue, and moveable mouth, said mouth mechanism further comprising a mouth opening with simulated lips configured to assume both an open and a closed mouth position with a trigger positioned at said soft palate that is reactive to the position of the simulated nipple on the at least one simulated breast relative to the soft palate, said mouth cavity simulating a natural mouth anatomy of a human infant forming a suction ingress wherein said mouth mechanism comprising said mouth cavity forming the suction ingress is configured to simulate movements of said tongue against the hard and soft palate; and
   c. a feedback system disposed within the body of the doll, the feedback system powered by the power source, the feedback system connected to and capable of processing input from the trigger, the feedback system comprising an alert mechanism for alerting a user of the position of the simulated nipple on the at least one simulated breast relative to the soft palate, the feedback system connected to a suction mechanism comprising the suction ingress formed by said mouth cavity.

2. The breastfeeding training system of claim 1, wherein the trigger comprises a sensor, the sensor having a sensing field capable of ascertaining the location of the simulated nipple on the at least one simulated breast relative to the soft palate of the mouth mechanism.

3. The breastfeeding training system of claim 1, further comprising a light emitting diode disposed on the surface of the doll and connected to the feedback system.

4. The breastfeeding training system of claim 1, further comprising at least one transparent cheek disposed on the head of the doll whereby the mouth mechanism and the location of the simulated nipple on the at least one simulated breast within the mouth mechanism is visible to the user through the transparent cheek.

5. The breastfeeding training system of claim 1, wherein the at least one simulated breast is comprised of a resilient material selected from the group consisting of rubber, silicone, plastic, latex and combinations thereof.

6. The breastfeeding training system of claim 1, wherein the simulated nipple on the at least one simulated breast is comprised of a resilient material selected from the group consisting of rubber, silicone, plastic, and combinations thereof.

7. A breastfeeding training doll comprising:
  a. a humanoid figure shape comprising a head and a body;
  b. a power source disposed within the body;
  c. a mouth mechanism disposed within the head, the mouth mechanism comprising a mouth cavity simulating a natural mouth anatomy of a human infant comprising simulated gums, hard palate, soft palate, tongue, and moveable mouth, said mouth mechanism further comprising a mouth opening with simulated lips configured to assume both an open and a closed mouth position with a trigger positioned at said soft palate that is reactive to the position of a nipple relative to the soft palate, said mouth cavity simulating a natural mouth anatomy of a human infant forming a suction ingress wherein said mouth mechanism comprising said mouth cavity forming the suction ingress is configured to simulate movements of said tongue against the hard and soft palate; and
  d. a feedback system disposed within the body, the feedback system powered by the power source, the feedback system connected to and capable of processing input from the trigger, the feedback system comprising an alert mechanism for alerting a user of the nipple's position relative to the soft palate, the feedback system connected to a suction mechanism comprising the suction ingress formed by said mouth cavity.

8. The breastfeeding training doll of claim 7, wherein the trigger comprises a sensor, the sensor having a sensing field in communication with the nipple.

9. The breastfeeding training doll of claim 7, further comprising a light emitting diode disposed on the surface of the doll and connected to the feedback system.

10. The breastfeeding training doll of claim 7, further comprising at least one transparent cheek disposed on the head of the doll whereby the mouth mechanism and the location of a nipple within the mouth mechanism are visible to the user through the transparent cheek.

11. A method for breastfeeding training comprising the steps of:
  a. providing a chest piece comprising a wearable support means for removably positioning the chest piece on the chest of a user and at least one simulated breast having a simulated nipple that elongates with the application of suction;
  b. providing a doll comprising a humanoid figure shape comprising a head and a body, a power source disposed in the body, a mouth mechanism disposed in the head, the mouth mechanism comprising a mouth cavity simulating a natural mouth anatomy of a human infant comprising simulated gums, hard palate, soft palate, tongue, and moveable mouth, said mouth mechanism further comprising a mouth opening with simulated lips configured to assume both an open and a closed mouth position with a trigger positioned at said soft palate that is reactive to the at least one simulated nipple, said mouth cavity simulating a natural mouth anatomy of a human infant forming a suction ingress wherein said mouth mechanism comprising said mouth cavity forming the suction ingress is configured to simulate movements of said tongue against the hard and soft palate;
  c. providing a feedback system disposed in the doll, the feedback system powered by the power source, the feedback system connected to and capable of processing input from the sensor, the feedback system comprising a mechanism for alerting a user of the simulated nipple on the at least one simulated breast's position relative to the sensor;
  d. positioning the mouth mechanism of the doll and the suction ingress disposed therein to receive the simulated nipple, whereby when properly positioned, the simulated nipple will elongate with the application of suction at the suction ingress until the sensor senses the simulated nipple on the at least one simulated breast and sends a signal to the feedback system when the simulated nipple on the at least one simulated breast is within a preset distance; and
  e. alerting the user when the feedback system receives the signal from the sensor.

12. The method of claim 11, wherein the trigger comprises a sensor, the sensor having a sensing field in communication with the simulated nipple on the at least one simulated breast.

* * * * *